March 20, 1945.  V. R. HOLMGREN  2,371,996
COLLECTOR RING ASSEMBLY
Filed Sept. 14, 1943
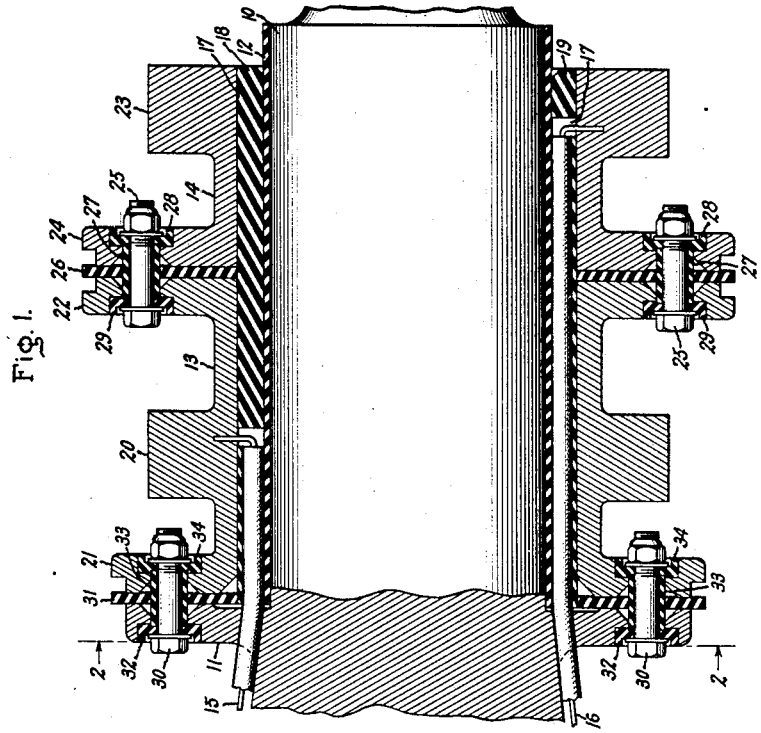
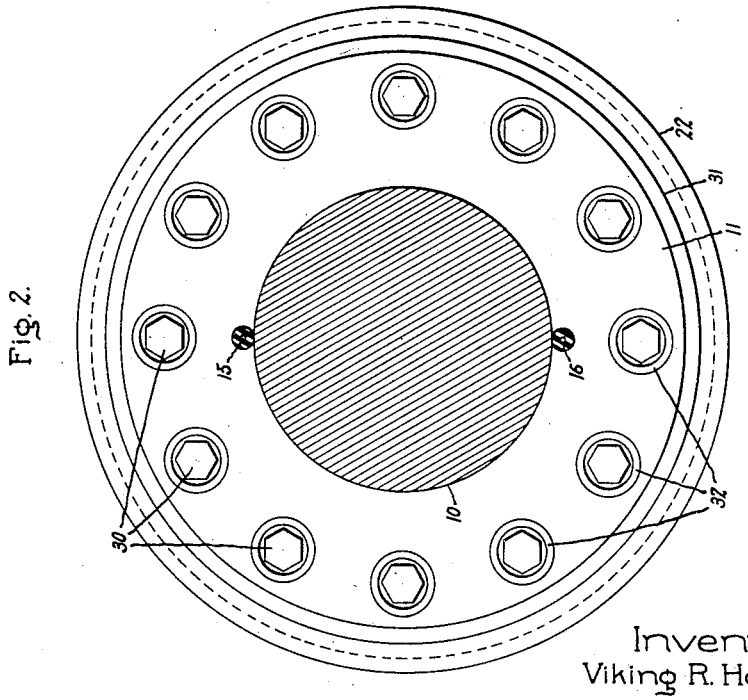
Inventor:
Viking R. Holmgren,
by Harry E. Dunham
His Attorney.

Patented Mar. 20, 1945

2,371,996

UNITED STATES PATENT OFFICE 2,371,996

COLLECTOR RING ASSEMBLY

Viking R. Holmgren, Lynn, Mass., assignor to General Electric Company, a corporation of New York Application September 14, 1943, Serial No. 502,291

5 Claims. (Cl. 171—322)

This invention relates to collector ring assemblies.

Collector ring assemblies of various types have been used in the past in which a plurality of collector rings is assembled over a supporting element and insulated therefrom by being shrunk over an insulating element arranged over the supporting member. This is the conventional practice of making this type of current collector and results in stresses set up in the ring which prevent using the collector ring until it has worn to its full depth, as these stresses might cause breaking or cracking of the rings if they are worn too thin. Furthermore, this method of shrinking rings over insulation involves an uncertain factor which arises regarding the proper fit of the ring over the insulation due to uncertain thicknesses of insulating material, such as mica in the insulating element, and the effect of heating on the binder used in the manufacture of the insulation.

An object of my invention is to provide an improved collector ring assembly.

Another object of my invention is to provide an improved longer wearing collector ring assembly in which the rings are provided with retaining flanges which also assist in maintaining a lower ring temperature by providing a greater radiating surface.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a longitudinal sectional view through a collector ring assembly embodying my invention; and Fig. 2 is a sectional view taken along line 2—2 of Fig. 1.

Referring to the drawing, I have shown an embodiment of my improved collector ring assembly construction which includes a supporting member 10 which may be the shaft of a dynamoelectric machine. This shaft is formed with an outwardly extending annular flange 11 and is provided with a sleeve of insulating material 12 about which collector rings are adapted to be arranged. This sleeve 12 is preferably formed of a preshrunk insulating material, such as a preshrunk Textolite tube, which forms a tight frictional fit with the supporting portion of the shaft 10 about which it is arranged. A pair of collector rings 13 and 14 is arranged over the insulating sleeve 12, and these rings are adapted to be electrically connected to a part of the dynamoelectric machine winding by insulated conductors 15 and 16 which extend through openings in the shaft flange 11 and through passages 17 formed through the inner sides of the collector rings. These conductors are electrically connected to the collector rings, and insulating plugs 18 and 19 are adapted to fill the ends of the passages 17 to prevent the entrance of foreign substances therein. The collector ring 13 is formed with an outwardly extending collar 20 which forms the current collecting portion of the ring and also is provided with outwardly extending flanges 21 and 22 at the ends thereof. The collector ring 14 is formed with an outwardly extending collar 23 which forms the current collecting portion of the ring and is provided with an outwardly extending flange 24 which is mechanically secured to the flange 22 of the collector ring 13 by a plurality of through bolts 25 which extend through openings in these two flanges. A ring of insulating material 26 is arranged between the adjacent surfaces of the flanges 22 and 24, and insulating bushings 27, 28, and 29 are arranged about the bolts 25 to insulate these bolts from the slip ring flanges. These bolts provide retaining means for holding the slip rings in assembled relationship, and this assembly is secured to the supporting shaft 10 by a plurality of bolts 30 which extend through openings in the shaft flange 11 and corresponding openings in the collector ring flange 21. These two flanges are insulated from each other by a ring 31 of insulating material, and insulating bushings 32, 33, and 34 are arranged about the bolts 30 to insulate these retaining elements from the collector ring flange 21 and the shaft flange 11. With this construction, the collector rings 13 and 14 can be used until they are substantially worn to the slots 17 without danger of cracking or breaking due to stresses set up during their assembly and wear. Furthermore, the bolts 25 and 30 preferably are arranged with the bolt heads and nuts extending out from the flanges. This produces a fan effect which greatly increases the cooling effect of the air which circulates over the rings, which together with the outwardly extending retaining flanges on these rings which provide relatively large radiating surfaces results in a greatly reduced operating temperature for these rings.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A collector ring assembly comprising a supporting member having an outwardly extending flange, insulating material arranged about said supporting member, a plurality of collector rings having a tight sliding fit on said insulation and having outwardly extending and axially displaced cooling and retaining flanges, insulation between adjacent surfaces of said ring flanges and between said supporting member flange and the adjacent ring flange, retaining means for securing together said collector rings, and retaining means for securing said collector rings to said supporting member flange.

2. A collector ring assembly comprising a supporting member having an outwardly extending flange, insulating material arranged about said supporting member, a plurality of collector rings having a tight sliding fit on said insulation and having outwardly extending and axially displaced cooling and retaining flanges, insulation between adjacent surfaces of said ring flanges and between said supporting member flange and the adjacent ring flange, insulated retaining means extending through said ring flanges for securing together said collector rings, and insulated retaining means extending through said supporting member flange and the adjacent ring flange for securing said collector rings to said supporting member.

3. A collector ring assembly comprising a supporting member having an outwardly extending flange, insulating material arranged about said supporting member, a plurality of collector rings having a tight sliding fit on said insulation and having outwardly extending and axially displaced cooling and retaining flanges, insulation between adjacent surfaces of said ring flanges and between said supporting member flange and the adjacent ring flange, retaining means extending through said ring flanges for securing together said collector rings, retaining means extending through said supporting member flange and the adjacent ring flange for securing said collector rings to said supporting member, conductor passages in said rings, and insulated conductors connected to said rings and extending through said passages in said rings.

4. A collector ring assembly comprising a supporting member having an outwardly extending flange, insulating material arranged around said supporting member and on one side of said flange, a plurality of collector rings fitted over said insulation on said supporting member and being provided with outwardly extending and axially displaced cooling and retaining flanges, insulation between adjacent surfaces of said ring flanges, retaining means extending through adjacent of said ring flanges for securing together said collector rings, and retaining means extending through said supporting member flange and the adjacent ring flange for securing said collector rings to said supporting member, both of said retaining means extending axially beyond said flanges for providing fan impeller elements for circulating cooling air over said rings.

5. A collector ring assembly comprising a supporting member having an outwardly extending flange, insulating material arranged around said supporting member and on one side of said flange, a plurality of collector rings fitted over said insulation on said supporting member and being provided with outwardly extending and axially displaced cooling and retaining flanges, insulation between adjacent surfaces of said ring flanges, retaining means extending through adjacent of said ring flanges for securing together said collector rings, retaining means extending through said supporting member flange and the adjacent ring flange for securing said collector rings to said supporting member, both of said retaining means extending axially beyond said flanges for providing fan impeller elements for circulating cooling air over said rings, conductor passages in said rings, and insulated conductors connected to said rings and extending through said passages in said rings.

VIKING R. HOLMGREN.